United States Patent [19]

Cattaneo et al.

[11] Patent Number: 4,508,295
[45] Date of Patent: Apr. 2, 1985

[54] DEVICE FOR DETECTING AND PREVENTING THE FORMATION OF ICE ON CONTOURED SURFACES

[75] Inventors: Christian J. Cattaneo, Lissy; Patrick R. J. Derouet, Soignolles en Brie; Michel C. F. Laroche, Le Mee sur Seine, all of France

[73] Assignee: S.N.E.C.M.A., Paris, France

[21] Appl. No.: 502,701

[22] Filed: Jun. 9, 1983

[30] Foreign Application Priority Data

Jun. 9, 1982 [FR] France .................................. 82 10004

[51] Int. Cl.³ ...................... B64D 15/04; B64D 15/18; B64D 15/22
[52] U.S. Cl. ........................... 244/134 A; 244/134 B; 244/134 F
[58] Field of Search ........... 244/134 R, 134 A, 134 B, 244/134 P, 207

[56] References Cited

U.S. PATENT DOCUMENTS

| | | | |
|---|---|---|---|
| 2,168,328 | 8/1939 | Diehl | 244/134 A |
| 2,489,799 | 11/1949 | Minshall | 244/134 A |
| 2,876,970 | 3/1959 | Halbert | 244/134 C |
| 3,614,038 | 10/1971 | Nichols | 244/134 C |
| 3,976,270 | 8/1976 | Catchpole | 244/134 F |

FOREIGN PATENT DOCUMENTS

| | | | |
|---|---|---|---|
| 468294 | 9/1950 | Canada | 244/134 F |
| 949863 | 9/1949 | France | 244/134 A |
| 518463 | 2/1940 | United Kingdom | 244/134 A |
| 567970 | 3/1945 | United Kingdom | 244/134 C |

Primary Examiner—Trygve M. Blix
Assistant Examiner—Rodney Corl
Attorney, Agent, or Firm—Oblon, Fisher, Spivak, McClelland & Maier

[57] ABSTRACT

In a device for breaking up ice formed on a contoured surface before it reaches a dangerous thickness, a flexible and porous membrane is fixed on the contoured surface along airtight lines of contact defining elementary chambers, each of which communicates with a main chamber inside the contoured surface. The main chamber is fed continuously by a source of hot gases. The closing up of the pores of the membrane by ice causes an inflation of the elementary chambers and a deformation of the membrane. Application is to the cowl of the air intake of a turbojet engine and to a detector used for the control of a de-icing device of any type.

15 Claims, 4 Drawing Figures

DEVICE FOR DETECTING AND PREVENTING THE FORMATION OF ICE ON CONTOURED SURFACES

BACKGROUND OF THE INVENTION

1. Field of the Invention

This invention relates to a device for detecting and preventing the formation of ice on contoured surfaces.

2. Description of the Prior Art

In particular, all the elements of an aircraft exposed to the impact of outside air flow are liable, under icing conditions, to be the site of a rapid accumulation of ice. The solidification of supercooled water begins at all the impact points of the body contours, spreads gradually and can form blocks which deform the aerodynamic contours, abruptly break loose and damage the body structures.

In the air intake of a turbojet engine in particular, the blocks which are formed on the intake lip, on the fixed or hinged cowl or on the intake directrix of the engine can damage the blades and the vanes or, when they are centrifuged by the turobjet rotor, the inner walls of the jet flow.

SUMMARY OF THE INVENTION

This invention has as its objects the prevention of ice from forming under normal conditions and, under severe icing conditions, the breaking up and elimination of the ice before it reaches a dangerous thickness.

A preventive arrangement is already known relating to the first object, in which a de-icing liquid is brought through an opening on the outer surface of the structure, through a chamber whose outer wall is porous, so as to make possible a distribution of the de-icing liquid over the outer surface. However, this device necessitates carrying antifreeze liquid on board and the use of a start-up control activated by the pilot.

Other known arrangements use a flexible membrane, deformable under the action of pneumatic pressure, to break up the ice that could form on the forward edge of an aircraft wing and eliminate it before it reaches dangerous thicknesses. However, these known arrangements also require a pressurization control to be started.

The device according to the invention is of the type having a wall that can be deformed under the action of pneumatic pressure and which can meet both of said objectives simultaneously. Furthermore, it eliminates the necessity of a start-up control because its operation is entirely automatic.

The device for detecting and preventing the formation of ice on contoured surfaces, according to the invention, is of the type having a wall that can be deformed under the action of pneumatic pressure. The deformable wall is porous and fixed on a hollow rigid support structure that forms a main chamber along airtight lines of contact that define elementary chambers, each elementary chamber having at least one opening for communication with the main chamber within the hollow structure, the main chamber being fed continuously by a source of hot gas.

It is understood that under normal conditions, the continuous feeding of the main chamber by a source of hot gas permits the hot gas to exit through the porous wall which covers the contoured surface of the support structure and makes it possible to prevent the formation of ice. This feeding of hot gas taken, for example, from the output flow of a compressor, requires only a small discharge of energy.

In the case of severe icing conditions, the pores of the deformable wall are closed up by the ice, and the elementary chambers, being automatically pressurized, are inflated and are deformed to break up the ice before it reaches a dangerous thickness. Moreover, when the ice begins to cover the deformable wall, it insulates it from the cold airflow, which permits it to become heated and thus facilitates the separation of the ice.

A variant of the invention relates to a device for detecting ice formation. This application is advantageous, in that it makes it possible to automate a standard de-icing device having a triggering control. In such a variant, the support structure and the deformable membrane are provided, in at least one point of each elementary chamber, with electric means whose movement produces a signal. The increase of the pressure in the main chamber or in an elementary chamber can also provide a detection signal.

An advantage is that this detector, placed on the area the most vulnerable to icing, can operate continuously with a minimum drawing of energy, and be able to deliver a control signal to a controlled de-icing system, of whatever type.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
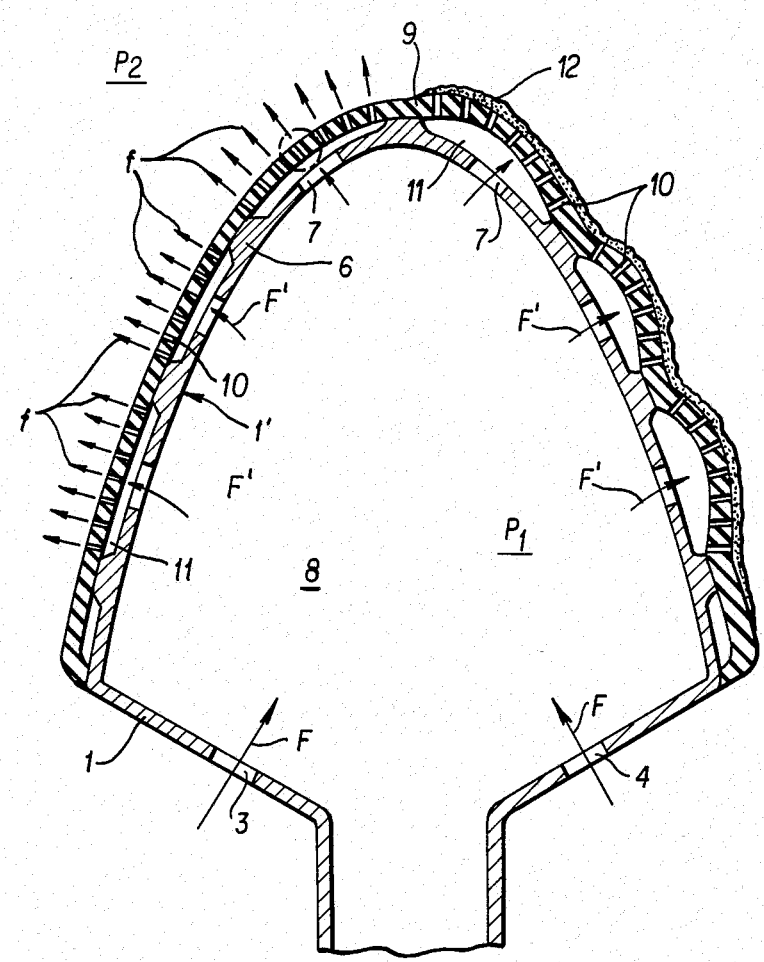
FIG. 1 is a view in section of an application of the invention to a cowl of an aircraft turbojet engine, for example, a hinged cowl.

Shown schematically in FIG. 1 is an oval hinged cowl 1 of a turbomachine, forming a hollow body of revolution about the vertical axis in FIG. 1 and having a shaft 2. This body is continuously fed with hot gas, in the direction of arrows F, through openings 3 and 4, connected to a source of hot air (not shown) coming from a compressor, for example.

Projecting ribs 6 are regularly spaced along parallel lines on the outer face of contoured part 1' of body structure 1. The ribs shown are annular, but other ribs, not appearing in the Figure, are distributed along a second family of parallel lines, for example, along certain directrixes of the cowl, so as to form a relatively regular meshwork. Each mesh has at least a largediameter hole 7 through which the hot air contained in chamber 8 escapes, in the manner indicated by arrows F'. A flexible membrane 9, consisting, for example, of an elastomer, is fixed to part 1' of the support structure by ribs 6.

Membrane 9 and portion 1' of the structure are fixed to one another in an airtight manner along the path of ribs 6 so that the ribs define elementary chambers such as 11, of small height, covering the entire contoured surface of the structure.

Figure 3:
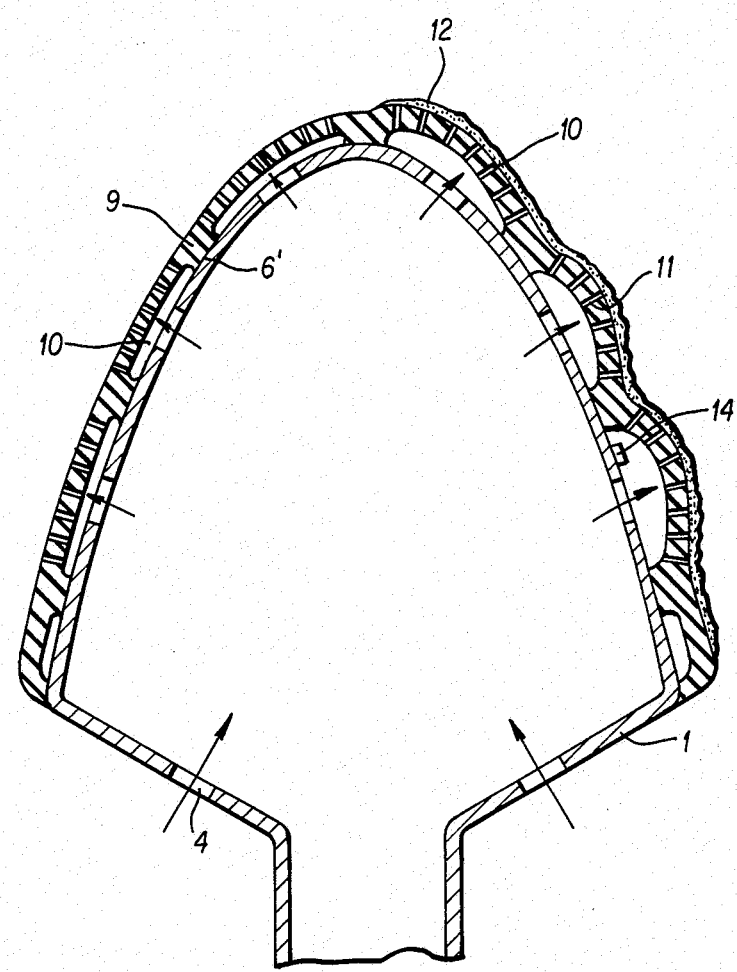
FIG. 3 is a view similar to FIG. 1 but showing a second embodiment of the invention.

The ribs 6' defining the elementary chambers could instead be carried by the flexible membrane, for example, by being molded therewith during the manufacture of the membrane (FIG. 3).

Figure 4:
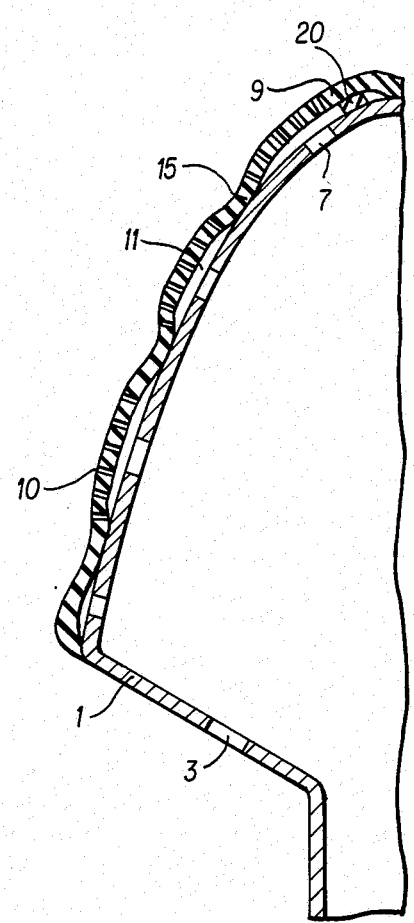
FIG. 4 partially shows a third embodiment of the invention.

In a simplified version, the ribs on the contoured surface of the structure could be dispensed with; the lines of contact between the flexible membrane and the support body would then consist simply of lines of glue 15 applied in parallel lines or in the shape of a grid on the cowl, before the mounting of the membrane (FIG. 4).

Flexible membrane 9 is shown, on the left portion of FIG. 1, under normal operating conditions with air escaping through the pores of the wall and, on the right portion of the figure, under severe icing conditions where the pores of the flexible wall are closed up.

Deformable wall 9, which is made, for example, of an elastomer or an elastic fabric, is drilled with holes or pores 10 of small diameter over its entire surface, with the possible exception of sites such as 6 where it is fixed to the outer surface of the support body.

Pressure P1 prevailing inside the chamber fed continuously with hot air is greater than the ambient temperature P2 prevailing in the atmosphere. It is seen on the left portion of FIG. 4 (arrows f) that the hot air escapes continuously through holes or pores 10 of membrane 9. Outer flexible membrane 9 is thus continuously heated and, under normal conditions this flow of air is sufficient to prevent any formation of ice.

On the right portion of FIG. 1 is illustrated the operation of the device when more severe conditions arise. The contact of the outside air, charged with supercooled water, with the surface of the membrane can be sufficient enough to trigger a solidification of the water, particularly at all the points of the body contour that are the most exposed to impact. The icing then spreads gradually, sometimes at a very rapid rate. The ice which is formed as seen on the right portion of FIG. 1 then closes up holes or pores 10 of flexible membrane 9 which has the effect of preventing the air penetrating through openings 7 from escaping. Each elementary chamber 11 is then pressurized and the part of the membrane defined by the lines of contact or ribs 6 is deformed and changes its curvature. This deformation has the effect of breaking the film of ice 12 before it reaches a dangerous thickness.

Figure 2:
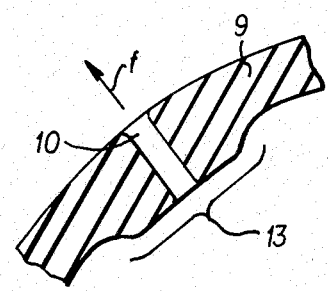
FIG. 2 is a view in greater detail of the porous deformable wall of FIG. 1.

It is fundamental, for the proper operation of the device according to the invention, that wall 9 exhibit good characteristics of flexibility, porosity and long life. By way of example, in the enlarged view of FIG. 2, illustrating a detail (indicated by a circle in FIG. 1) of a partial section of flexible membrane 9, there are seen inner reinforcements 13, molded unitarily with the membrane and provided at the periphery of each pore 10 in order to prevent a beginning of a tear at the holes or pores 10 during the deformation.

It is thus noted that the device uses two combined actions to fight the icing; on the one hand a heating action due to a flow of hot air through the flexible membrane and, on the other hand, a mechanical action linked to the deformation of the flexible membrane when the pores of the flexible membrane are closed up by a film of ice.

It is also noted that the use of this mechanical action is performed automatically without complicated accessories, valves, pick-ups, etc.

In a variation of the above structure, the device can be used as an icing detector. The device can then have smaller dimensions and be placed selectively in an area particularly vulnerable to icing. Detecting means, shown schematically at 20 in FIG. 4, are associated with the movement of the membrane are then provided to deliver a signal when the membrane is deformed. For example, a push rod elastically pressing on the inner face of the deformable wall 9 and sliding through an opening of the fixed body 1' can activate an electric contact housed in a casing (not shown) attached to the inside of the fixed body.

In another example, the electrical detecting means can consist of the armatures of a capacitor, placed respectively on the fixed body 1' and on the deformable wall 9 inside each elementary chamber 11. The variation of capacitance due to a movement of the deformable wall 9 is then able, by an oscillating circuit, for example, to produce a signal.

The detection means used to deliver a signal can also consist of a pressure sensor, of known type, adjusted to deliver a signal for a pressure exceeding a predetermined threshold (P3>P1). This sensor can be placed in the main chamber 8, or else in a suitably chosen one of the elementary chambers 11 as shown schematically at 14 in FIG. 3.

The signal delivered by this detector can be used for the control of a de-icing device of any type, particularly a device requiring a considerable energy supply. It will be noted that the continuous feeding of power to a small-sized detector, according to the invention, requires only a very small energy supply, without a notable influence on the specific fuel consumption of an aircraft engine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for detecting and preventing the formation of ice on contoured surfaces, comprising:
    a rigid hollow support structure including a contoured surface;
    a deformable wall covering said contoured surface;
    means for providing an airtight securement between said support structure and said deformable wall along a plurality of lines of contact, whereby a plurality of elementary chambers are defined by said support structure, said deformable wall and said means for providing an airtight securement;
    at least one first opening between the interior of said support structure and each of said elementary chambers;
    at least one opening in said deformable wall at each said elementary chamber; and
    means for feeding hot gas to said interior of said support structure.

2. The device as in claim 1 wherein said means for providing an airtight securement comprises ribs projecting outward from said support structure.

3. The device as in claim 1, wherein said means for providing an airtight securement comprises ribs projecting inward belonging to the deformable wall.

4. The device as in claim 1, wherein said means for providing an airtight securement comprises an adhesive substance between said support structure and said deformable wall.

5. The device as in claim 1, wherein the lines of contact are distributed along parallel lines.

6. The device as in claim 1, wherein some of said lines of contact intersect one another so as to form a network of said lines.

7. The device for detecting the formation of ice as in claim 1 wherein said support structure and said deformable wall include electric movement detection means at each said elementary chamber.

8. The device for detecting the formation of ice as in claim 1, wherein at least one of said elementary chambers is equipped with an excess pressure sensor which produces an excess pressure signal.

9. The device of claim 1 wherein said deformable wall is formed of an elastomeric material.

10. The device as in claim 2 wherein the lines of contact are distributed along parallel lines.

11. The device of claim 3 wherein the lines of contact are distributed along parallel lines.

12. The device of claim 4 wherein the lines of contact are distributed along parallel lines.

13. The device of claim 2 wherein some of said lines of contact intersect one another so as to form a network of said lines.

14. The device as in claim 3 wherein some of said lines of contact intersect one another so as to form a network of said lines.

15. The device as in claim 4 wherein some of said lines of contact intersect one another so as to form a network of said lines.

* * * * *